United States Patent [19]

Coté

[11] Patent Number: 4,763,863

[45] Date of Patent: Aug. 16, 1988

[54] SPACER BRACKETS FOR ELECTRICAL SUPPLY CONTAINER

[76] Inventor: Agenor Coté, 1456, 12e nord, Fleurimont, Quebec, Canada, J1H 5H2

[21] Appl. No.: 124,169

[22] Filed: Nov. 23, 1987

[51] Int. Cl.⁴ .............................................. F16L 3/08
[52] U.S. Cl. .................... 248/74.1; 248/544
[58] Field of Search ................ 248/74.1, 309.2, 219.3, 248/544, 49, 65, 73, 220.2, DIG. 6, 210; 52/508; 220/3.3, 3.2, 3.5

[56] References Cited

U.S. PATENT DOCUMENTS

| | | | |
|---|---|---|---|
| 1,190,971 | 7/1916 | Williams, Jr. | 248/74.1 |
| 3,102,611 | 9/1963 | Mote | 52/508 X |
| 3,286,963 | 11/1966 | Bergman | 248/74.1 |
| 3,498,575 | 3/1970 | Downing | 248/74.1 X |
| 4,101,191 | 7/1978 | Gould et al. | 248/219.3 X |
| 4,216,934 | 8/1980 | Knickerbocker | 248/309.2 |
| 4,437,281 | 3/1984 | See et al. | 52/508 X |
| 4,667,840 | 5/1987 | Lindsey | 220/3.3 X |
| 4,673,097 | 6/1987 | Schuldt | 220/3.3 X |

Primary Examiner—Ramon O. Ramirez
Attorney, Agent, or Firm—Roland L. Morneau

[57] ABSTRACT

A spacer for mounting on an unfinished wall of a house and adapted to support electrical supply container has a predetermined thickness, so that the electrical power supply container will be substantially flush with the finished wall when the latter will be completed. The spacers are made of a galvanized metal box filled with polyurethane. The spacers have flanges for allowing its fixation on the unfinished wall and anchor means for supporting the electrical power supply containers.

8 Claims, 4 Drawing Sheets

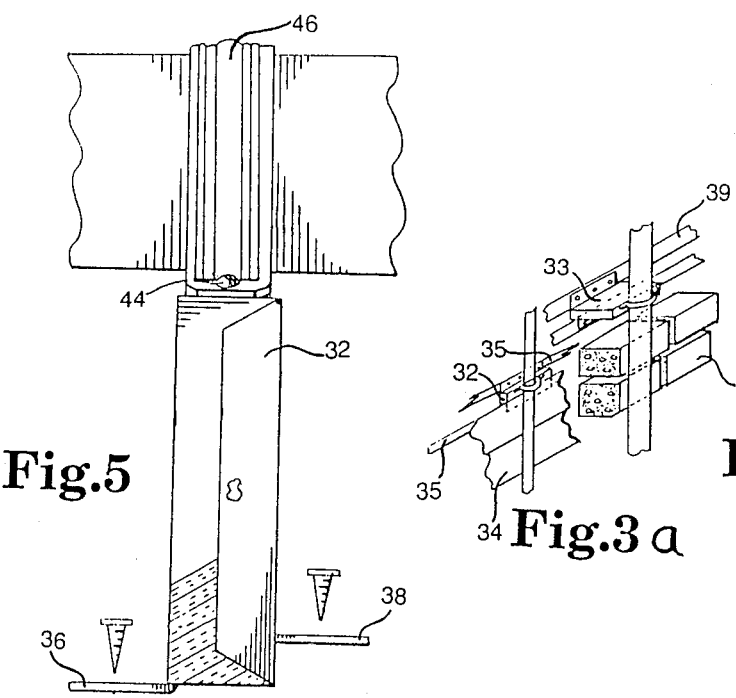
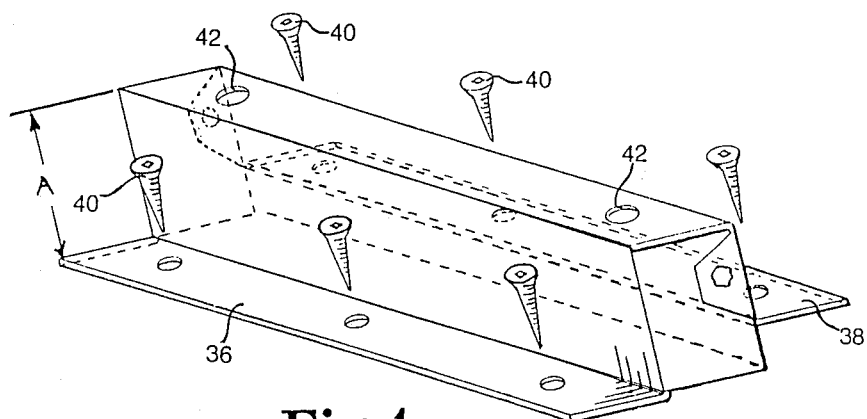

4,763,863

SPACER BRACKETS FOR ELECTRICAL SUPPLY CONTAINER

BACKGROUND OF THE INVENTION

1. Field of the Invention

The invention relates to spacer brackets adapted to be mounted on the unterminated walls of a building or a house to support power supply containers and conduits. The new bracket is fixed to the wall before the bricks, the siding or the like are applied on the wall. The outer face of the bracket is at a predetermined distance from its base to be substantially flush with the finished wall.

2. Prior Art

No bracket of similar construction and purpose has been found in the prior art. U.S. Pat. Nos. 4,101,191 and 4,216,934 were identified as of interest only.

Presently, the electrical supply boxes are installed on finished walls. The electrician must drill through the bricks or siding to install anchoring bolts or the like to which will be mounted the electrical supply or meter boxes, pipes or the like. Such installation is laborious and may loosen up with time.

SUMMARY OF THE INVENTION

The spacer bracket according to the invention comprises a plate, sidewalls rigidly secured and extending away from one face of the plate for reinforcing the latter and for forming an opened box type construction. The sidewalls have a predetermined height adapted to raise the plate at the level of a finished wall of a building. Two opposite sidewalls have outwardly projecting flanges along the edges remote from the plate. Means are provided on the flanges for connecting the bracket on the unfinished wall and the plate is also provided with further means for mechanically connecting electrical supply boxes, pipes or the like.

BRIEF DESCRIPTION OF THE DRAWINGS

FIGS. 3a and 3b are enlarged perspective view of two spacer brackets, for bricks and for shingles respectively, FIG. 4 is a perspective view of a spacer bracket according to another embodiment of the invention, FIG. 5 is a side view of the bracket shown in FIG. 4 with a pipe retaining clip.

DETAILED DESCRIPTION OF THE DRAWINGS

Figure 1:
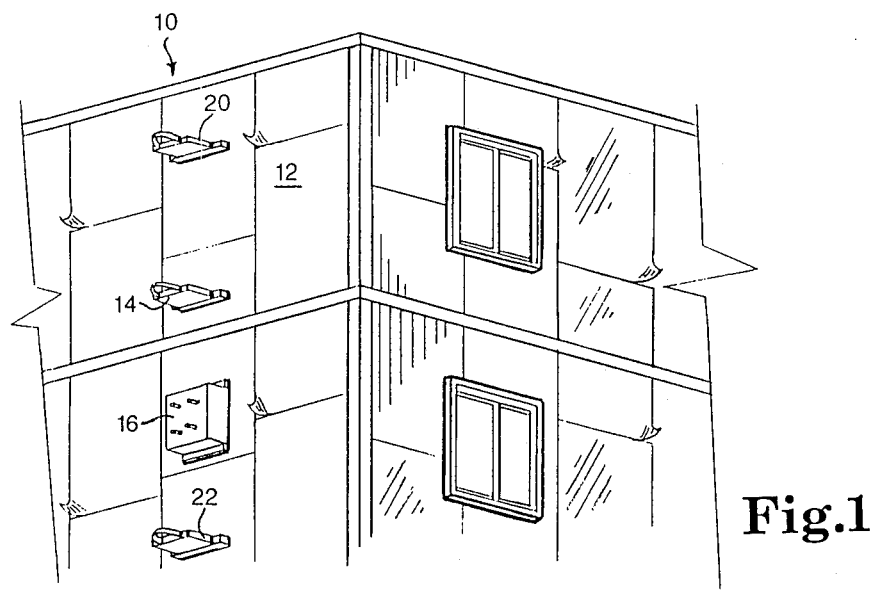
FIG. 1 is a perspective view of a corner of a house with unfinished wall displaying spacers according to the invention.

FIG. 1 illustrates the corner of a house 10 at an unfinished stage of the construction wherein the exterior walls 12 are covered by tar paper, insulating material or the like which are adapted to be covered by stones or bricks, metal, plastic or wood siding or other finishing material. Such finishing material adds to the thickness of the wall. The electrical conduits for wires and the electrical boxes are usually mounted over the finished wall, which for the purpose of the description is made of bricks. Spacers such as 14 and 16 are secured to a part of the frame of the house and in general to the wooden frame-work. They can be easily aligned because they do not have to be positioned to fit in the joints of the bricks.

With spacers according to the invention, it is possible to supply an electrical conduit 18 on which are slidably mounted spacers 14, 20, 22 and 16. The spacer 16 is intended to be located under the electrical box 24 which contains the electrical controls, such as fuses, meters or the like. The conduit 18 is vertically positioned at the desired location on the unfinished wall 12 and the spacers are slidably adjusted on the conduit 18 to be threadedly secured to horizontal slats or rails such as 26, 28, 30 of a wooden frame-work or a frame-work on which mounting bracket can be hooked to.

The depth of the spacer is predetermined to correspond to the thickness of the material of the finished wall such as bricks or siding (shown in FIG. 3) or any other exterior finish for buildings.

The spacer according to the invention has a box-like shape with a flat top and an opened bottom adapted to sit on a flat surface. It has a rigid shape for supporting relatively heavy weights. It is fire-proof or at least fire resistant. It also needs to be corrosion-proof considering that humidity and condensation can, with time, weaken the spacer. The permanent solidity of the spacer is a requirement, considering that the spacer cannot be easily removed and replaced. In practice, metal, plastic or rubber having the above characteristics are suitable material for the spacers.

In FIG. 3a, the spacer 32 has a very limited thickness because it is intended for siding 34. The spacer 32 as illustrated more clearly in FIGS. 4 and 5 is an elongated box made of galvanized metal filled with an insulating material such as polyurethane, polysterene or the like. The inner surface of the box has a frosted finish to increase the retention of the insulating material. The thickness A corresponds to the spacer between the unfinished and finished wall. The spacer 32 is fixed to transversal slats 35 (FIG. 3a) with screws 40 provided through a pair of flanges 36 and 38. The flanges 36 and 38 are not necessarily on the same plane and their relative positions are dictated by the surface condition of the unfinished walls and the relative position of the slats 35.

Figure 2:
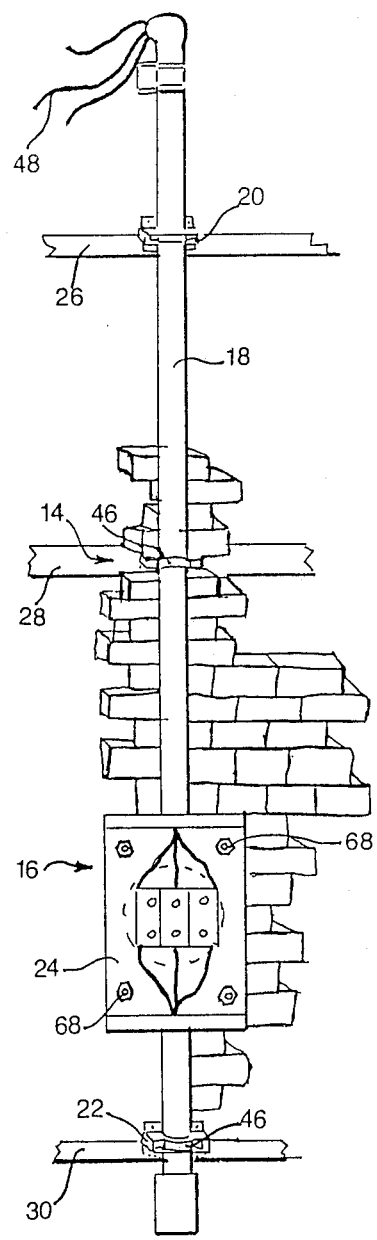
FIG. 2 is front plan view of the spacers shown in FIG. 1, with a power supply box and electrical conduit mounted thereon over a bricks finish.

The spacer 32 is provided with two apertures 42 on its raised surface for receiving screws which hold a bracket 46 adapted to fasten the tubular electrical conduit for wires 48 reaching the electrical box 24 as shown in FIG. 2.

In FIG. 3b, the spacer 33 is similar to spacer 32 of FIG. 3a except that it has a greater depth allowing for the insertion of bricks 37 between the slats 39 and the raised or top face of the spacer 33.

Figure 6:
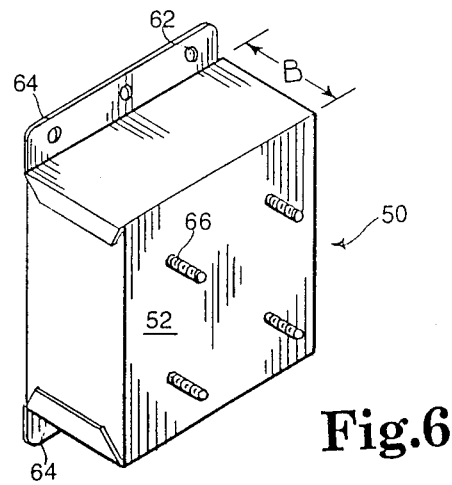
FIG. 6 is a perspective view of a spacer bracket for a power supply box.
Figure 7:
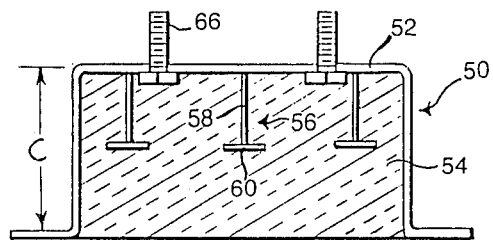
FIG. 7 is a vertical cross-sectional view of the bracket shown in FIG. 6 and, FIGS. 8a and 8b are perspective views of two other embodiments of the spacer.

Another embodiment of the invention is spacer 50 shown in FIGS. 6 and 7. It is intended to support the electrical box 24 shown in FIG. 2. The spacer 50 has a raised surface 52 of a dimension substantially similar to the ones of the electrical box 24 for providing a firm anchor to the box 24. The spacer is made of a fire and corrosion resistant material such as galvanized iron and is filled with an insulating material 54 such as polyurethane. The polyurethane which adheres to the inner surface of the spacer 50 prevents humidity from building up and the corrosion which would results from it.

When the spacer such as 50 has a depth C in which the insulating material could not be positively retained inside the spacer 50 by its adherence to the inner surface of the spacer, retaining members 56 are fixed on the bottom of the raised surface 52. An embodiment of such retaining members 56 is illustrated in FIG. 7 and consists of rods 58 welded on the surface 52 in a staggered fashion and each rod holds a small flat plate 60 at a distance away from the top surface 52. The number and the size of the plates 60 varies with the degree of adherence desired. The spacer 50 is held to the unfinished wall by screws (not shown) introduced in the apertures 62 provided in flanges 64.

Means for supporting the electrical box 24 are provided on the raised surface 52 of the spacer 50. In the embodiment shown in FIGS. 6 and 7, threaded rods 66 are secured on the surface 52 and project exteriorly on that latter surface. The rods 66 are spaced in such a manner as to penetrate inside corresponding apertures in the electrical box 24 which is held by bolts 68 as shown in FIG. 2.

Figures 8A, 8B:
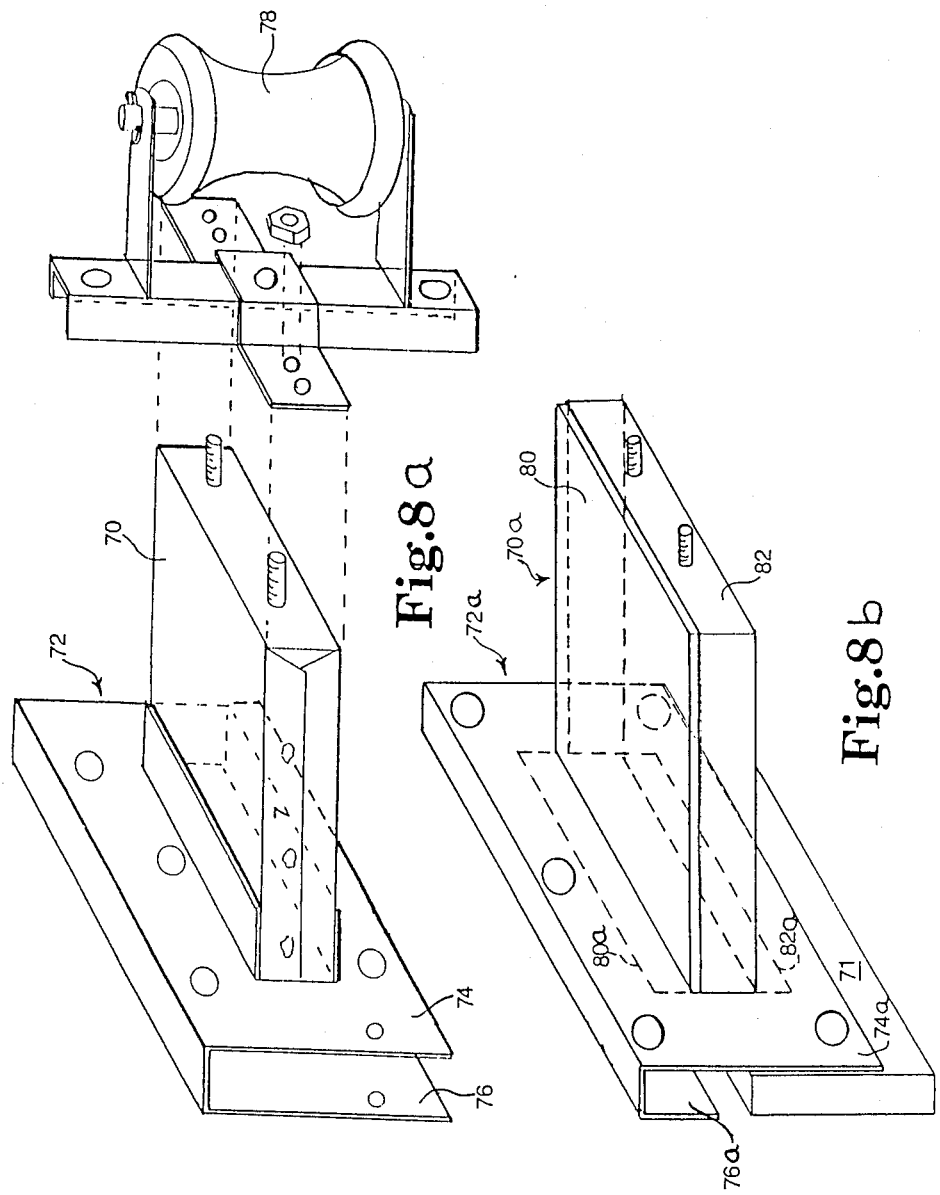

Spacers according to the invention, may be held to partition on the unfinished wall by various anchor means. In FIG. 8, the spacer 70 which is of the general type described above, is intended to be supported on the upper edge of vertically positioned board 71 as shown in FIG. 8b. A U-shaped bracket 72 is fixed to the spacer 70. The flanges 74 and 76 rides over the board 71 and firmly hold the spacer 70. The spacer 70 is used to support the roller 78 which hold the electric wires at the top of the conduit 18 shown in FIG. 2. FIG. 8b shows an embodiment similar to FIG. 8a, wherein the bracket 72a has a rear flange 76a shorter than the front flange 74a. The spacer 70a is formed by two oppositely superposed U-shaped plates 80 and 82 which are spot-welded on each side of the plates to hold them rigidly together. Each plate has a ledge 80a and 82a which project through an opening in the front flange 74a corresponding to the cross-section of the spacer 70a. The ledges 80a and 82a are folded against the back of the flange 74a and sport-welded thereto. This arrangement constitutes a very solid structure adapted to support heavy weights.

I claim:

1. A spacer for mounting an electrical power supply container on an unfinished wall of a building comprising a box-shaped element having a generally flat top face and an opened bottom face adapted to sit on a flat surface, the said top face and bottom face being located at a predetermined distance from one another, the said box-shaped element having rigid sides made of a fire and corrosion resistant material, at least one flange extending outwardly along one edge of said bottom face, means on said flange for securing said box element to said unfinished wall, rigid insulating material completely filling said box-type element and firmly adhering to said box and anchor means on said top face for connecting an electrical container fixture thereto.

2. A spacer as recited in claim 1 wherein the said connecting means on said top face are threaded rods extending outwardly on said top face.

3. Spacing bracket as recited in claim 2 comprising retaining members fixed inside said box element, the said retaining members displaying staggered plates in location away from said top face, the said staggered plates being adapted to retain the insulating material inside the box element.

4. Spacing bracket as recited in claim 2 wherein the said box element has a frosted finish on the side adjacent the said insulating material.

5. Spacing bracket as recited in claim 2 wherein the said box element is made of a material selected from metal, plastic or rubber.

6. Spacing bracket as recited in claim 3 comprising a half circular clip adapted to hold a tubular pipe, the said clip being removably threaded at both ends to the said threaded rods.

7. Spacing bracket as recited in claim 3 wherein the said flange is provided with an additional flange parallel to said bottom face to form a U-shaped bracket adapted to suspend the said box element from a horizontal rail.

8. Spacing bracket as recited in claim 2 wherein the insulating material is selected from polyurethane and polysterene.

* * * * *